(12) United States Patent
Ishida et al.

(10) Patent No.: US 6,557,950 B2
(45) Date of Patent: May 6, 2003

(54) HYDRAULIC BRAKE APPARATUS FOR A VEHICLE

(75) Inventors: Yasuhito Ishida, Anjo (JP); Yasunori Sakata, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/052,524

(22) Filed: Jan. 23, 2002

(65) Prior Publication Data
US 2002/0096936 A1 Jul. 25, 2002

(30) Foreign Application Priority Data
Jan. 23, 2001 (JP) .......................... 2001-014073

(51) Int. Cl.[7] .................. B60T 13/66; B60T 13/68; B60T 13/70; B60T 13/72; B60T 15/14
(52) U.S. Cl. ................. 303/20; 303/3; 303/15; 303/125; 303/155; 303/119.1
(58) Field of Search ............... 303/3, 15, 16, 303/125, 138, 155, 159, 160, 161, 166, 171, 181, 182, 183, 119.1, 20, 114.1

(56) References Cited

U.S. PATENT DOCUMENTS

| 5,978,725 | A | | 11/1999 | Kagawa | |
|---|---|---|---|---|---|
| 6,183,049 | B1 | * | 2/2001 | Oka et al. | 303/114.1 |
| 6,189,986 | B1 | * | 2/2001 | Shimizu et al. | 303/155 |
| 6,318,815 | B1 | * | 11/2001 | Haupt et al. | 303/113.4 |
| 6,354,672 | B1 | * | 3/2002 | Nakamura et al. | 303/113.1 |
| 6,375,282 | B1 | * | 4/2002 | Inoue et al. | 303/191 |
| 6,382,737 | B1 | * | 5/2002 | Isono et al. | 303/114.1 |
| 6,390,568 | B1 | * | 5/2002 | Tozu et al. | 303/114.3 |
| 6,412,881 | B1 | * | 7/2002 | Isono | 303/114.1 |
| 6,412,882 | B1 | * | 7/2002 | Isono et al. | 303/114.1 |
| 6,430,493 | B2 | * | 8/2002 | Tanaka et al. | 701/70 |
| 6,460,944 | B2 | * | 10/2002 | Isono et al. | 303/159 |
| 6,478,385 | B1 | * | 11/2002 | Nishii et al. | 303/114.1 |
| 6,485,113 | B2 | * | 11/2002 | Riley et al. | 303/138 |

FOREIGN PATENT DOCUMENTS

| JP | 4-201629 A | 7/1992 |
|---|---|---|
| JP | 11-157424 A | 6/1999 |

* cited by examiner

Primary Examiner—Christopher P. Schwartz
Assistant Examiner—Devon Kramer
(74) Attorney, Agent, or Firm—Burns, Doane, Swecker & Mathis, LLP

(57) ABSTRACT

A hydraulic brake apparatus for a vehicle comprises a master cylinder and an auxiliary hydraulic pressure source. A master cylinder hydraulic pressure outputted from the master cylinder is adjusted by adding a master cylinder hydraulic pressure in response to an operation of a brake operating member to a master cylinder hydraulic pressure at an auto-braking control when the brake operating member is operated during the auto-braking control. The master cylinder hydraulic pressure is adjusted by controlling an operation of a valve means so as to increase a power hydraulic-pressure supplied from the auxiliary hydraulic pressure source to a regulating means corresponding to the amount of the operation of the brake operating member.

20 Claims, 9 Drawing Sheets

HYDRAULIC BRAKE APPARATUS FOR A VEHICLE

This application is based on and claims priority under 35 U.S.C. §119 with respect to a Japanese Patent Application 2001-014073 filed on Jan. 23, 2001, the entire content of which is Incorporated herein by reference.

FIELD OF THE INVENTION

This invention generally relates to a hydraulic brake apparatus for a vehicle. More particularly, this invention pertains to a vehicle hydraulic brake apparatus adapted to perform auto-braking control regardless of operation of a brake pedal and provided with a master cylinder, an auxiliary hydraulic pressure source, and a regulating mechanism.

BACKGROUND OF THE INVENTION

Various types of vehicle hydraulic pressure brake apparatus are known. U.S. Pat. No. 5,978,725 (corresponding to a Japanese Patent Application Toku-Kai-Hei 11-157424) discloses a brake control apparatus for switching a control mode from an auto-braking mode in which a brake force is controlled according to the distance between the vehicle and another forwardly located vehicle or obstacle to a manual braking mode in which the brake force is controlled in accordance with the braking operation by a driver. The brake control apparatus disclosed in the U.S. patent mentioned above is designed to decrease a variation of the brake force when the control mode is switched from the auto-braking mode to the manual braking mode in accordance with the braking operation by the driver. To do this, the time at which the auto-braking mode should be switched to the manual braking mode is set to be delayed from the start time of the braking operation.

The patent describes that the disclosed brake control apparatus is intended to overcome drawbacks which may be included in a running control apparatus according to Japanese Patent Laid-Open Publication 4-201629. In this running control apparatus, when a driver carries out a braking operation (a depressing operation of the brake pedal) during the brake force control in the auto-braking mode, the intention of the driver takes priority over the brake force control in the auto-braking mode so that the auto-braking mode is released. As a result, the vehicle is braked with a brake force corresponding to the amount of operation of the brake pedal (in the manual braking mode).

The brake control apparatus disclosed in the above-mentioned U.S. patent can delay the time at which the auto-braking mode should be switched to the manual braking mode so that the auto-braking mode is switched to the manual braking mode in a state where the brake force corresponding to the amount of the braking operation after start of the braking operation has been generated. Therefore, the brake control apparatus can effectively decrease a variation with respect to the brake force when the auto-braking mode is switched to the manual braking mode.

The objective of the brake control apparatus described in the aforementioned U.S. patent and the objective of the running control apparatus described in the aforementioned the Japanese patent publication are similar in that the variation of the brake force should be decreased when the control mode is switched from the auto-braking mode to the manual braking mode. That is, the brake force according to the auto-braking mode is switched to the brake force generated by a master cylinder hydraulic pressure only in response to the brake pedal operation when the control mode is switched from the auto-braking mode to the manual braking mode at a predetermined time.

According to the brake control apparatus with the above-described structure in which the control mode is switched from the auto-braking mode to the manual braking mode at the predetermined time, when the amount of brake pedal operation is small in the situation where the brake pedal operation is performed during the auto-braking mode in response to the driver's intention to require a further brake force, the brake force may not be generated as sufficiently as the driver expects or desires. Thus, sufficient brake feeling may not be obtained by the driver. For example, when the brake pedal is operated in response to the driver's intention to require the brake pedal operation in the state where the brake force has been controlled in the auto-braking mode regardless of the brake pedal operation, the driver usually may expect that the brake force can be ultimately generated corresponding to the brake force in the auto-braking mode and the brake force in accordance with the operation of the brake pedal (in the manual braking mode). Therefore, the amount of brake pedal operation may be expected to become smaller compared with the amount of brake pedal operation at a normal state. In this case, the normal state designates a time when the brake pedal is further operated by the driver in a state where the brake force has been already generated by the brake pedal operation by the driver. As a result, the driver may feel uncomfortable when the control mode is switched to the manual braking mode.

Generally known auto-braking controls include a brake force control for maintaining a constant distance with respect to a forwardly located vehicle and brake force control for maintaining a constant vehicle speed while the vehicle is running down-hill. According to the former brake control, the vehicle distance towards the forwardly located vehicle, the speed or acceleration of the forwardly located vehicle, etc. are calculated, for example by a laser or by an image recognizing device. Therefore, a brake hydraulic pressure supplied to a wheel brake cylinder is controlled for maintaining a constant vehicle distance towards the forwardly located vehicle based upon the above-calculated values. According to the latter brake control, a brake hydraulic pressure supplied to a wheel brake cylinder is controlled by operation of a switch by the driver for matching an actual vehicle speed of the vehicle running down-hill with a target vehicle speed.

Known vehicle hydraulic pressure brake apparatus are still susceptible of certain improvements with respect to smoothly switching the control mode from the auto-braking mode to the manual braking mode corresponding to the brake pedal operation when the driver operates the brake pedal during the auto-braking control.

SUMMARY OF THE INVENTION

A hydraulic brake apparatus for a vehicle includes a brake operating member, a master cylinder including a master piston which is moved forward in response to a depressing operation of the brake operating member for pressurizing a brake fluid in a reservoir and outputting a master cylinder hydraulic pressure to wheel brake cylinders mounted on respective vehicle wheels in response to the forward movement of the master piston, an auxiliary hydraulic pressure source for pressurizing the brake fluid in the reservoir to a first predetermined pressure level and for outputting a power hydraulic pressure, regulating means connected to the auxiliary hydraulic pressure source and the reservoir for regulating the power hydraulic pressure outputted from the auxiliary hydraulic pressure source to a second predetermined pressure level for driving the master piston by the regulated power hydraulic pressure, and valve means for controlling the power hydraulic pressure supplied from the auxiliary hydraulic pressure source to the regulating means. Control means performs auto-braking control by controlling an operation of the valve means regardless of the depressing operation of the brake operating member for adjusting the master cylinder hydraulic pressure supplied to the wheel brake cylinder, and a braking operation detecting means detects the amount of the depressing operation of the brake operating member. The control means adjusts the master cylinder hydraulic pressure outputted from the master cylinder by adding the master cylinder hydraulic pressure in response to the operation of the brake operating member to a master cylinder hydraulic pressure at the auto-braking control when the brake operating member is operated while the auto-braking control is being performed by the control means.

Preferably, the control means adjusts the master cylinder hydraulic pressure by controlling the operation of the valve means to increase the power hydraulic pressure supplied from the auxiliary hydraulic pressure source to the regulating means corresponding to the amount of the operation of the brake operating member detected by the braking operation detecting means. In addition, vehicle speed detecting means is preferably provided for detecting a vehicle speed, and target vehicle speed determining means is provided for determining a target vehicle speed in response to a vehicle condition. The control means adjusts the master cylinder hydraulic pressure and performs the auto-braking control by controlling the operation of the valve means for meeting the vehicle speed detected by the vehicle speed detecting means during the vehicle running on a down-hill with the target vehicle speed determined by the target vehicle speed determining means. The control means also includes correcting means for correcting the target vehicle speed determined by the target vehicle speed determining means in response to the amount of the depressing operation of the brake operating member detected by the braking operation detecting means in a state where the brake operating member is operated during the auto-braking control. The braking operating detecting means can include a pressure sensor which detects the master cylinder hydraulic pressure outputted from the master cylinder, a depressing force sensor which detects a depressing force applied to the brake operating member, or a stroke sensor which detects a stroke of the brake operating member.

According to another aspect, a vehicle hydraulic brake apparatus includes a brake operating member, a master cylinder including a master piston which is moved forward in response to a depressing operation of the brake operating member to pressurize brake fluid in a reservoir and output a master cylinder hydraulic pressure to a wheel brake cylinder mounted on a vehicle wheel in response to the forward movement of the master piston, an auxiliary hydraulic pressure source for pressurizing the brake fluid in the reservoir to a first predetermined pressure level and outputting a power hydraulic pressure, regulating means connected to the auxiliary hydraulic pressure source and the reservoir for regulating the power hydraulic pressure outputted from the auxiliary hydraulic pressure source to a second predetermined pressure level to drive the master piston, and a solenoid valve unit controlling the power hydraulic pressure supplied from the auxiliary hydraulic pressure source to the regulating means. A sensor detects an amount of operation of the brake operating member, and control means performs auto-braking control by controlling operation of the solenoid valve unit independent of operation of the brake operating member to adjust the master cylinder hydraulic pressure supplied to the wheel brake cylinder. The control means adjusts the master cylinder hydraulic pressure outputted from the master cylinder when the brake operating member is operated while the auto-braking control is being performed by the control means by adding the master cylinder hydraulic pressure produced in response to the amount of operation of the brake operating member to the master cylinder hydraulic pressure produced during the auto-braking control.

Another aspect involves a method of controlling hydraulic pressure produced by a vehicle hydraulic brake apparatus that comprises a brake operating member, a master cylinder which pressurizes brake fluid in a reservoir through movement of a master piston and outputs a master cylinder hydraulic pressure to a wheel brake cylinder mounted on a vehicle wheel in response to the movement of the master piston, an auxiliary hydraulic pressure source which pressurizes the brake fluid in the reservoir to a predetermined pressure level and outputs a power hydraulic pressure to move the master piston, regulating means connected to the auxiliary hydraulic pressure source and the reservoir for regulating the power hydraulic pressure outputted from the auxiliary hydraulic pressure source to a second predetermined pressure level to drive the master piston, and a solenoid valve unit which controls the power hydraulic pressure supplied from the auxiliary hydraulic pressure source to the regulating means. The method involves detecting the amount of operation of the brake operating member, performing auto-braking control independent of operation of the brake operating member by controlling operation of the solenoid valve unit to adjust the master cylinder hydraulic pressure supplied to the wheel brake cylinder, and adjusting the master cylinder hydraulic pressure outputted from the master cylinder when the brake operating member is operated during auto-braking control by adding the master cylinder hydraulic pressure produced in response to the detected amount of operation of the brake operating member to the master cylinder hydraulic pressure produced during the auto-braking control.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
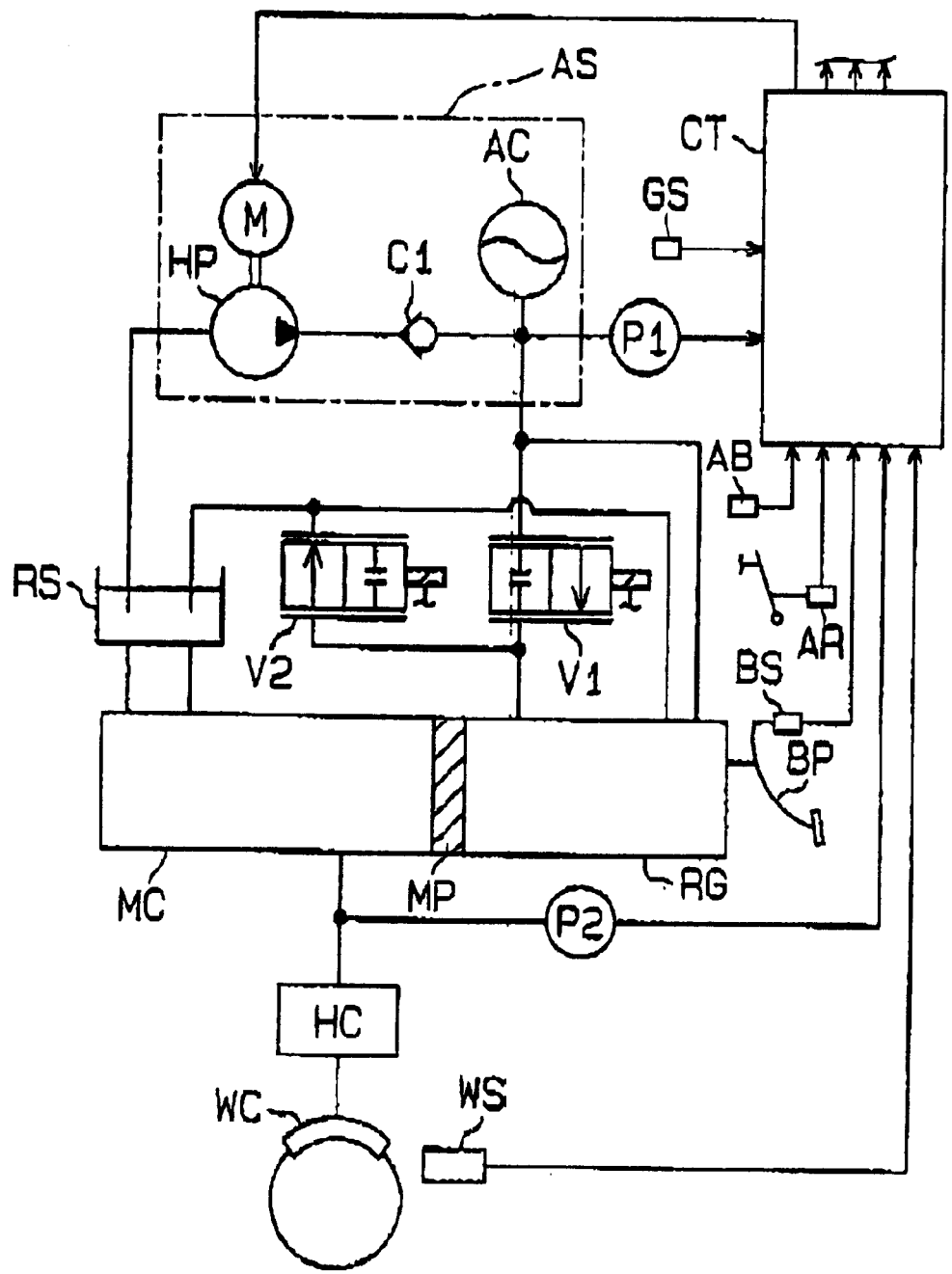
FIG. 1 is a schematic block diagram illustrating a hydraulic brake apparatus according to an embodiment of the present invention.

Referring to FIG. 1, a hydraulic brake apparatus according to an embodiment of the present invention is provided with an auxiliary hydraulic pressure source AS and a master cylinder MC having a master piston MP therein. The master piston MP is moved forward (i.e., to the left in FIG. 1) in response to the operation of a brake pedal BP (i.e., a brake operating member) by a driver. Brake fluid from a reservoir RS is pressurized in the master cylinder MC so that a brake hydraulic pressure is outputted from the master cylinder MC to each wheel brake cylinder WC mounted on each respective vehicle wheel. The auxiliary hydraulic pressure source AS increases the brake fluid in the reservoir RS to a predetermined pressure level and outputs a power hydraulic pressure.

The hydraulic brake apparatus is further provided with a regulating means RG connected to the auxiliary hydraulic pressure source AS and the reservoir RS. The regulating means is employed for regulating the power hydraulic pressure outputted from the auxiliary hydraulic pressure source AS to a predetermined pressure level for driving the master piston MP with the regulated hydraulic pressure.

Figure 2:
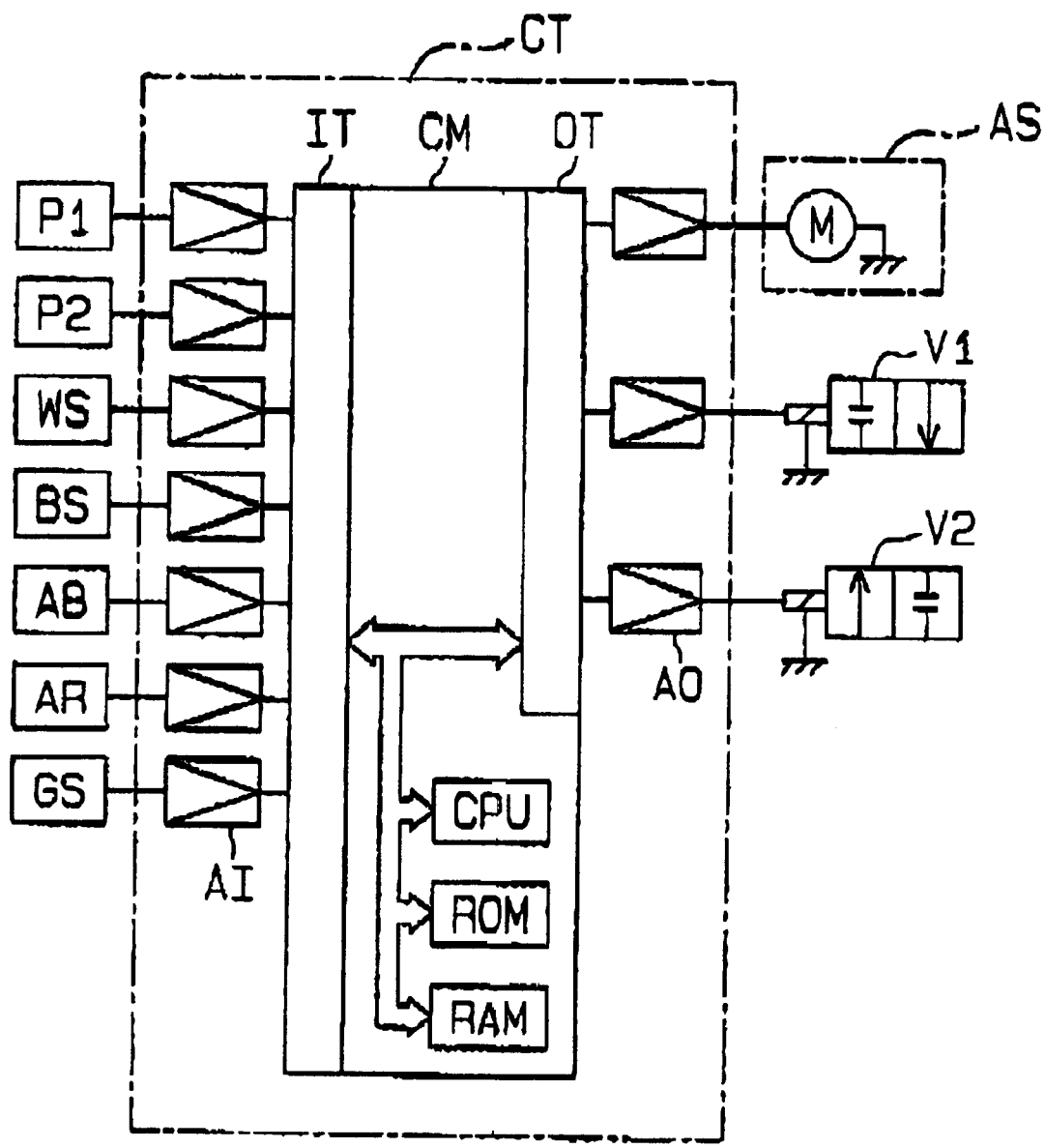
FIG. 2 is a schematic block diagram illustrating the general structure of the control means used in the hydraulic brake apparatus illustrated in FIG. 1.

The hydraulic brake apparatus further includes a braking operation detecting means, a valve means, and a control means. The braking operation detecting means is employed for detecting the amount of operation of the brake pedal BP (a brake operating member). The valve means is employed for controlling the power hydraulic pressure supplied from the auxiliary hydraulic pressure source AS to the regulating means RG. The valve means according to this illustrated and described embodiment comprises a solenoid valve unit formed by a normally closed type solenoid valve V1 and a normally open type solenoid valve V2. The control means is employed for controlling an operation of the valve means to adjust a master cylinder hydraulic pressure. The control means according to this illustrated and described embodiment comprises an electronic control device CT as illustrated in FIG. 1. Various details of the electronic control device CT are illustrated in FIG. 2. Although the respective solenoid valves V1, V2 are formed as linear solenoid valves as illustrated in FIG. 1, the respective solenoid valves V1, V2 may also be formed as open/close valves.

The auxiliary hydraulic pressure source AS includes a hydraulic pressure pump HP driven by an electric motor M, the reservoir RS, a check valve C1, and an accumulator AC. The inlet side of the hydraulic pressure pump HP is connected to the reservoir RS and the outlet side of the hydraulic pressure pump HP is connected to the accumulator AC via the check valve C1 and is further connected to the solenoid valve V1. The accumulator AC is connected to a pressure sensor Pi for detecting a power hydraulic pressure accumulated in the accumulator AC. The detected pressure value by the pressure sensor P1 is transmitted to the electronic control device CT which is operatively connected to the pressure sensor P1.

The hydraulic brake apparatus further includes a pressure sensor P2 for detecting the master cylinder hydraulic pressure as the braking operation detecting means. Therefore, the amount of operation of the brake operating member can be detected without disposing an additional sensor. When the brake pedal BP is operated by the driver during auto-braking control, the master cylinder hydraulic pressure corresponding to the amount of operation of the brake pedal BP is added to the master cylinder hydraulic pressure during the auto-braking control. Further, the solenoid valve V1 is controlled to increase the power hydraulic pressure supplied from the auxiliary hydraulic pressure source AS to the regulating means RG corresponding to the amount of operation of the brake pedal BP detected by the pressure sensor P2, wherein the master cylinder hydraulic pressure is adjusted. Therefore, the hydraulic brake apparatus according to the illustrated and described embodiment does not require adding another sensor for detecting the amount of operation of the brake pedal BP. Although the braking operation detecting means includes the pressure sensor P2 as illustrated in FIG. 1, it is to be understood that the braking operation detecting means may include, for example, a depressing force sensor for detecting the depressing force applied to the brake pedal BP or a stroke sensor for detecting the stroke of the brake pedal BP.

The hydraulic brake apparatus is further provided with various sensors and switches operatively connected to the electronic control device CT, including a vehicle wheel speed sensor WS for detecting a vehicle wheel rotating speed, a brake switch BS turned ON/OFF in response to the operation of the brake pedal BP an automatic brake switch AS turned ON in response to a driver's intention to set the auto-braking control, an accelerator pedal sensor AR for detecting the driver's operation of an accelerator pedal, and an acceleration sensor (G sensor) GS for detecting a vehicle acceleration. Signals detected by the above-described sensors and switches are supplied to the electronic control device CT.

As illustrated in FIG. 1, a hydraulic pressure control valve means HC comprised of a plurality of solenoid valves is disposed between the master cylinder MC and the wheel brake cylinders WC and is also controlled by the electronic control valve means HC to perform anti-skid control. A detailed description of the anti-skid control is not included here as it is known in the art.

As illustrated in FIG. 2, the electronic control device CT is provided with a microcomputer CM provided with a central processing unit CPU, a read only memory ROM, a random access memory RAM, an input interface IT and an output interface OT. Signals detected by the sensors P1, P2, WS, GS, AR and the switches BS, AB are inputted to the CPU via amplifying circuits Al and the input interface IT. The electric motor M Is also operatively connected to the electronic control device CT. Control signals are outputted from the output interface OT to the electric motor M via a driving circuit AO so that the electric motor M is controlled by the electronic control device CT. Electric current for driving the solenoid valves V1, V2 is controlled by the electronic control device CT based upon the signals from the respective sensors and switches. The controlled electric current is supplied to each solenoid valve V1, V2 via the output interface OT and each driving circuit AO. The ROM memorizes programs corresponding to the flow charts illustrated in FIGS. 3 and 4. The CPU performs or carries out the programs while an ignition switch is ON. The RAM temporarily memorizes variable data required to perform the programs. A set of processes for performing the auto-braking control is performed by the electronic control device CT. When the ignition switch is ON, predetermined programs are commenced by the microcomputer CM.

Figure 3:
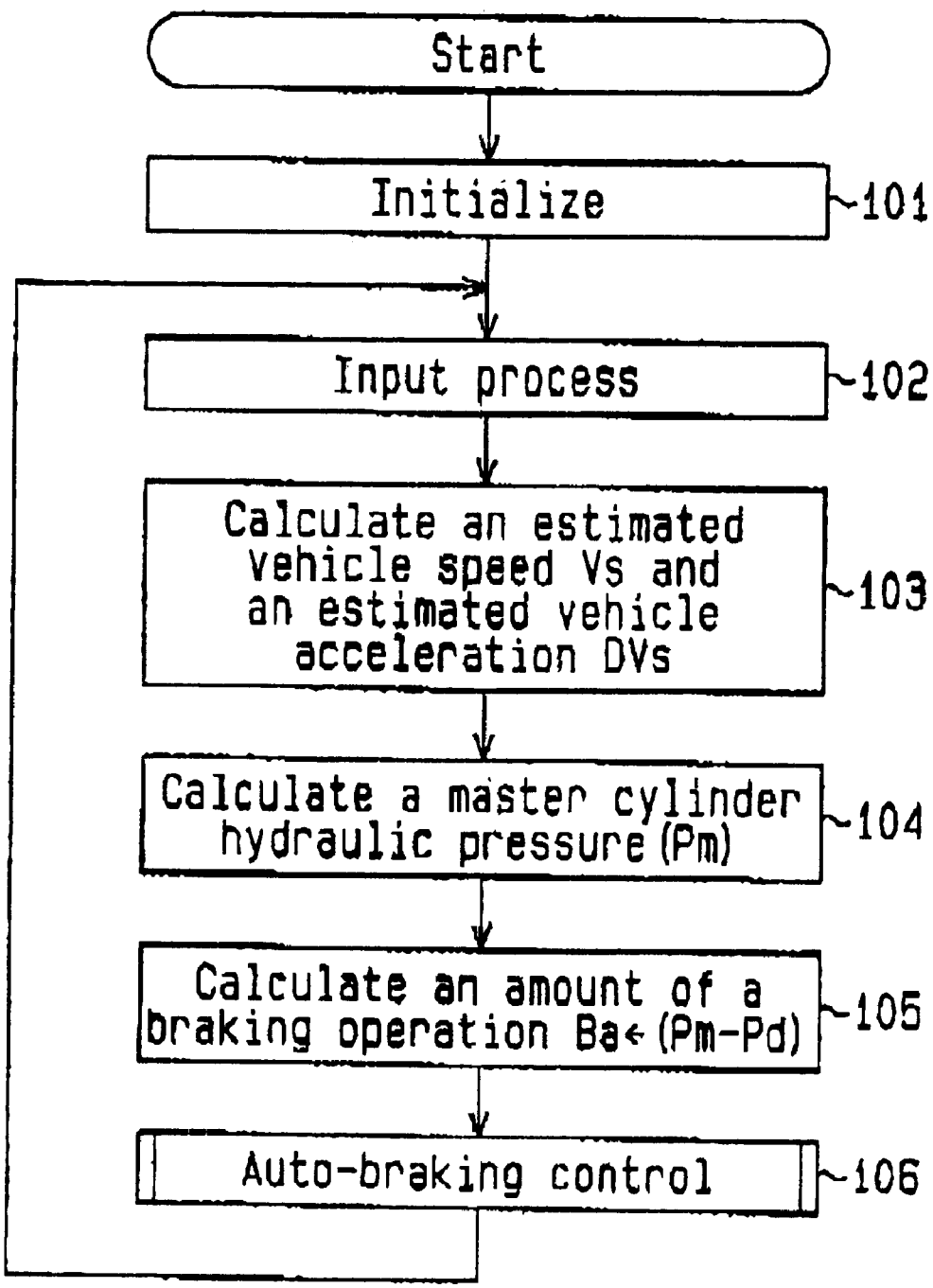
FIG. 3 is a general flow chart showing a program for performing an auto-braking control according.

The auto-braking control according to one embodiment is described below with reference to the flow charts illustrated in FIGS. 3 and 4. Referring to a general flow chart illustrated in FIG. 3, the microcomputer CM is first initialized at step 101 to clear various calculated values. At step 102, signals detected by, for example, the pressure sensors P1, P2, the vehicle wheel speed sensor WS and the brake switch BS are received by the microcomputer CM. At step 103, an estimated vehicle speed Vs (hereinafter, referred to as a vehicle speed Vs) is calculated based upon the vehicle wheel speed Vw detected by the vehicle wheel speed sensor WS. Further, at step 103, the vehicle speed Vs is differentiated to calculate an estimated vehicle acceleration DVs or an estimated vehicle deceleration DVs. At step 104, a master cylinder hydraulic pressure Pm is calculated based upon the signal detected by the pressure sensor P2. At step 105, the amount of operation of the brake pedal BP (the amount of the braking operation) Ba is calculated based upon the master cylinder hydraulic pressure Pm. In more detail, the amount of braking operation Ba is calculated based upon a pressure value (Pm−Pd). The pressure value (Pm−Pd) is calculated by subtracting an estimated master cylinder hydraulic pressure Pd during the auto-braking control (described later) from the master cylinder hydraulic pressure Pm. The program then proceeds to step 106 after completing the above-described processes. The auto-braking control is performed at step 106 and is described with reference to FIG. 4.

Figure 4:
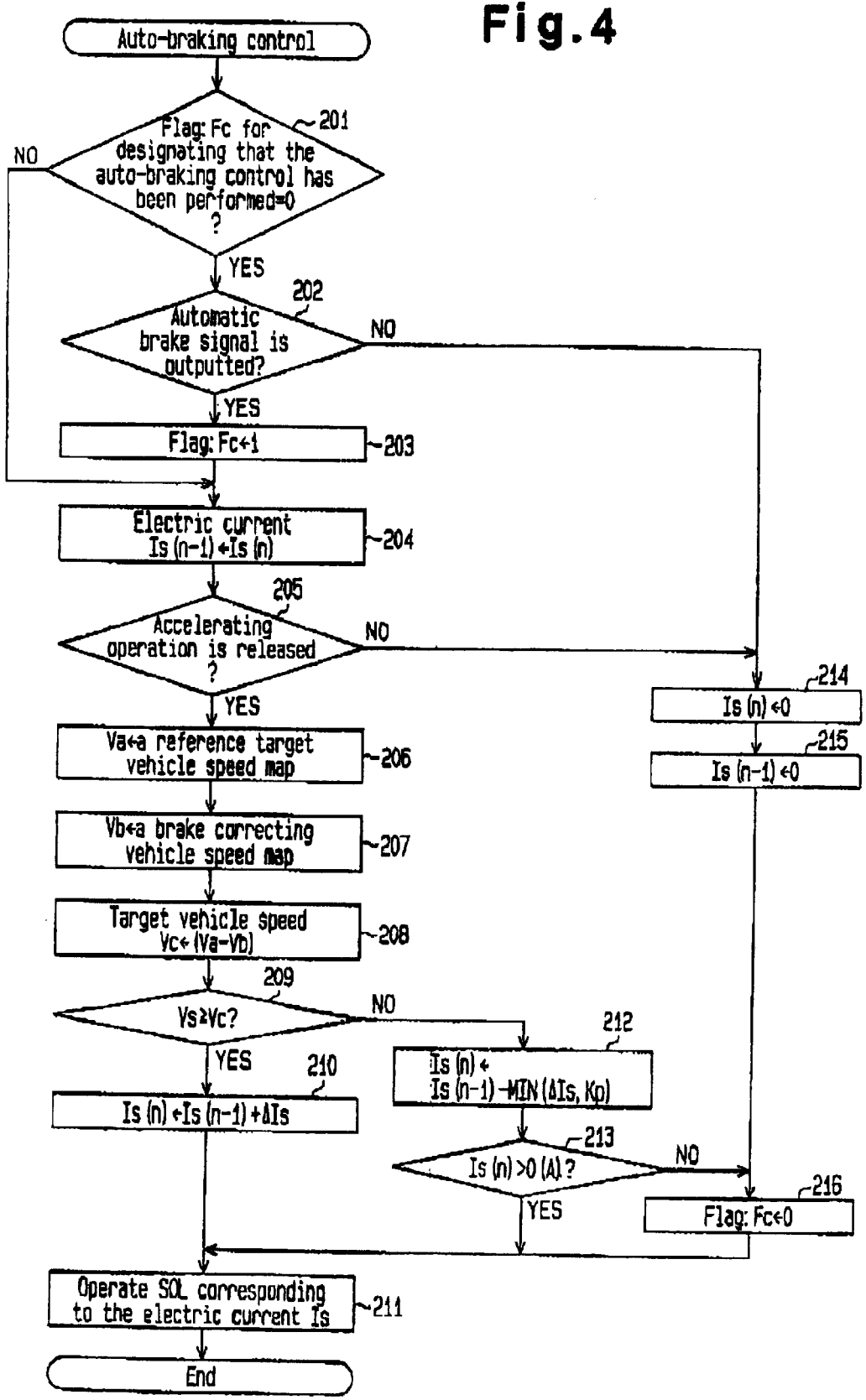
FIG. 4 is a flow chart showing a sub-routine of the auto-braking control according.

The flow chart illustrated in FIG. 4 is a sub-routine of the auto-braking control performed at step 106 in FIG. 4. The flow chart illustrated in FIG. 4 shows an example of a process performed by the hydraulic brake apparatus when the brake pedal BP is operated during the auto-braking control for controlling a vehicle at a constant speed in a state where the vehicle is running from a flat road towards a down-hill. At step 201, the microcomputer CM first determines whether or not a flag Fc is set at zero. The flag Fc set at zero designates that the auto-braking control has not been performed. The flag Fc set at "1" designates that the auto-braking control has been performed. When the flag Fc is set at zero, the program proceeds to step 202 to determine whether or not an automatic brake signal is outputted. More specifically, the automatic brake signal is set to be outputted when the vehicle speed Vs is equal to or above a predetermined speed Kv and the automatic brake switch AB is ON.

When the automatic brake signal is outputted at step 202, the program proceeds to step 203 to set the flag Fc at "1" and further proceeds to step 204. When the flag Fc is already set at "1" at the step 201, the program proceeds from step 201 directly to step 204. At step 204, the electric current Is(n) at the present time is set as the electric current Is(n−1) at a previous time. The program then proceeds to step 205 to determine whether or not an accelerating operation has been released based upon the signal detected by the accelerator pedal sensor AR. For example, When the driver releases the operation of the accelerator pedal to decrease the vehicle speed during the vehicle running from the flat road towards the down-hill, the program proceeds to step 206. At step 206, a reference target vehicle speed Va is set, based upon the reference target vehicle speed map illustrated in FIG. 5, at a lower value than the value of the actual vehicle speed Vs at the present time, corresponding to a slope angle of the down-hill. Therefore, at step 206, the reference target vehicle speed Va is set. Further, as described in more detail below, the reference target vehicle speed Va is used to determine a target vehicle speed Vc, with a control at the down-hill being commenced at step 209 in a state in which the actual vehicle speed Vs is equal to or greater than the target vehicle speed Vc.

Figure 5:
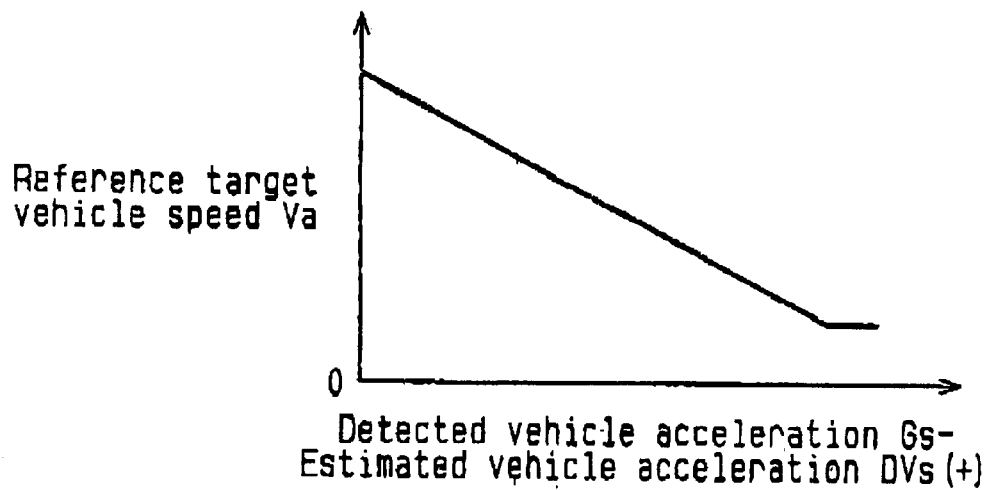
FIG. 5 is a graph illustrating an example of a map for determining a reference target vehicle speed.

The map illustrated in FIG. 5 shows the relationship between the inclination of the down-hill and the reference target vehicle speed Va. The vehicle acceleration DVs estimated based upon the vehicle wheel speed Vw includes only an element of the vehicle acceleration. On the other hand, the vehicle acceleration Gs detected by the acceleration sensor GS includes not only the element of the vehicle acceleration but also an element of the inclination of the down-hill. The inclination of the down-hill can thus be calculated by subtracting the estimated vehicle acceleration DVs from the vehicle acceleration Gs (Gs−DVs). Therefore, according to the map illustrated in FIG. 5, the reference target vehicle speed Va is set to be decreased in parallel with an increase in the inclination of the down-hill (Gs−DVs).

Figure 6:
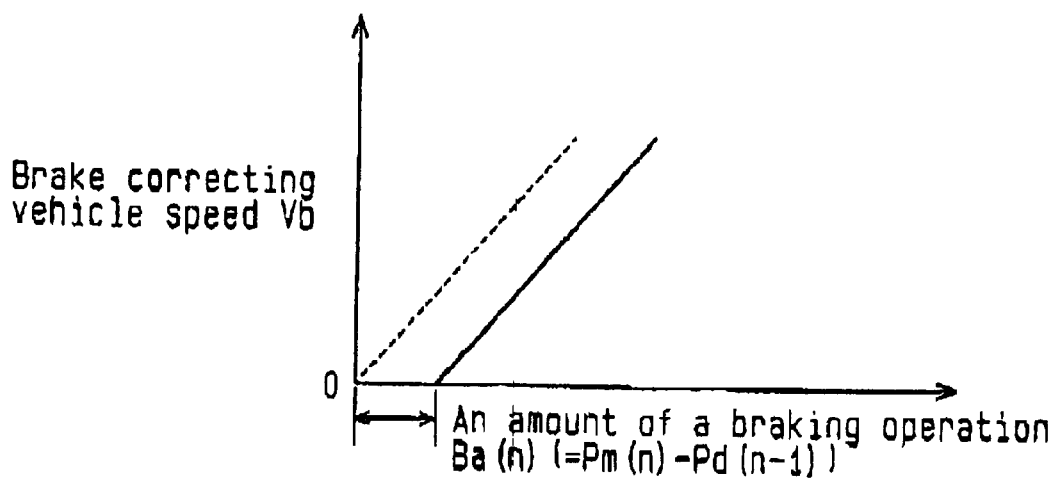
FIG. 6 is a graph illustrating an example of a map for determining a brake correcting vehicle speed.

The program proceeds to step 207 from step 206 to determine a brake correcting vehicle speed Vb corresponding to the amount of the braking operation based upon a brake correcting vehicle speed map illustrated in FIG. 6. In this case, the amount of braking operation Ba(n) is calculated based upon a pressure value (Pm(n)−Pd(n−1)). The pressure value (Pm(n)−Pd(n−1)) is calculated by subtracting the master cylinder hydraulic pressure Pd(n−1) at a previous time from the master cylinder hydraulic pressure Pm(n) at the present time. The brake correcting vehicle speed Vb is set to be approximately in parallel with the amount of the braking operation Ba(n). In the map illustrated in FIG. 6, the solid line designates a characteristic of the brake correcting vehicle speed Vb when the amount of braking operation Ba(n) is increased. On the other hand, the broken line in the map designates a characteristic of the brake correcting vehicle speed Vb when the amount of braking operation Ba(n) is decreased. That is, a dead zone is provided as illustrated by the arrow that is parallel with the X-axis in FIG. 6, wherein a hysteresis is determined.

Figure 7:
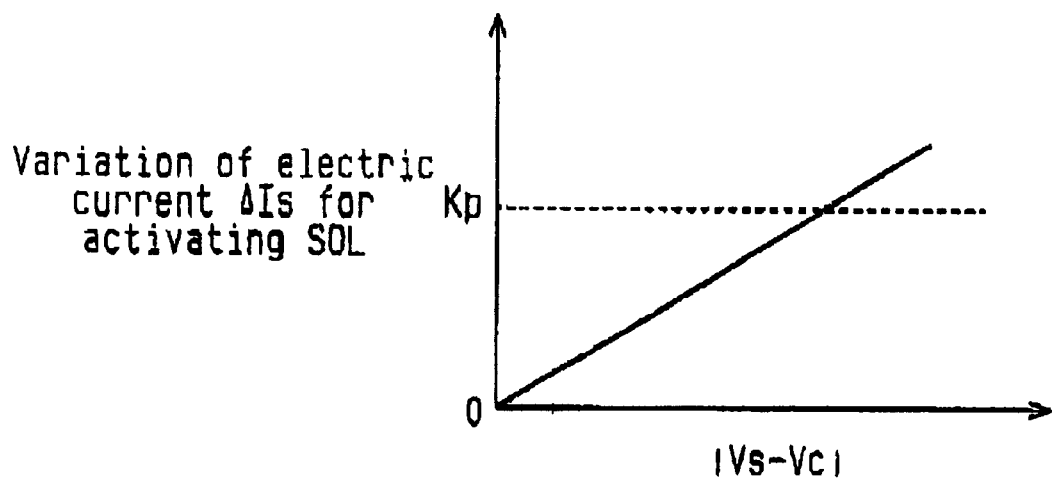
FIG. 7 is a graph illustrating an example of a map for determining a variation of the electric current for electrically operating a valve.

Next, at step 208, the target vehicle speed Vc is calculated by subtracting the brake correcting vehicle speed Vb, increased corresponding to the increase of the amount of the braking operation, from the reference target vehicle speed Va decreased corresponding to the increase of the inclination of the down-hill. The program then proceeds to step 209 to compare the actual vehicle speed Vs with the target vehicle speed Vc. When the actual vehicle speed Vs is equal to or greater than the target vehicle speed Vc, the program proceeds to step 210 to determine the electric current Is(n) at the present time by adding the electric current Is(n−1) at the previous time and the variation of the electric current ΔIs. The variation of the electric current ΔIs is calculated based upon an absolute value of the difference between the actual vehicle speed Vs and the target vehicle speed Vc|Vs−Vc| following the map illustrated in FIG. 7. When the absolute value of the difference |Vs−Vc| is relatively large, the variation ΔIs set to be large. On the other hand, when the absolute value of the difference |Vs−Vc| is relatively small, the variation ΔIs is set to be small.

When the microcomputer CM determines at step 209 that the actual vehicle speed Vs is less than the target vehicle speed Vc, the program proceeds to step 212. At step 212, the electric current Is(n) at the present time is determined to be a value calculated by subtracting the smaller value of either the variation of the electric current ΔIs or an upper threshold of the variation Kp from the electric current Is(n−1) at the previous time. The upper threshold of the variation Kp is employed for restricting a decreasing amount of the electric current, i.e., a decreasing pressure amount of the master cylinder hydraulic pressure so as to decrease an excessive decrease of the acceleration.

After step 212, the program proceeds to step 213 at which the microcomputer CM determines whether or not the electric current Is(n) at the present time determined at step 212 is a positive value. When the microcomputer CM determines at step 213 that the electric current Is(n) at the present time is a positive value, the program proceeds from step 213 to step 211 to drive the solenoid valves V1, V2 with electric current corresponding to the electric current Is(n). On the other hand, when the microcomputer CM determines at step 213 that the electric current Is(n) at the present time is equal to or less than zero, the program proceeds to step 216 to reset the flag Fc at zero.

When the microcomputer CM determines at step 205 that the accelerating operation has been performed, the program proceeds to steps 214 and 215. At step 214, the electric current Is(n) at the present time is set at zero. At step 215, the electric current Is(n−1) at the previous time is set at zero. The program then proceeds to step 216 to reset the flag Fc at zero.

Figure 8:
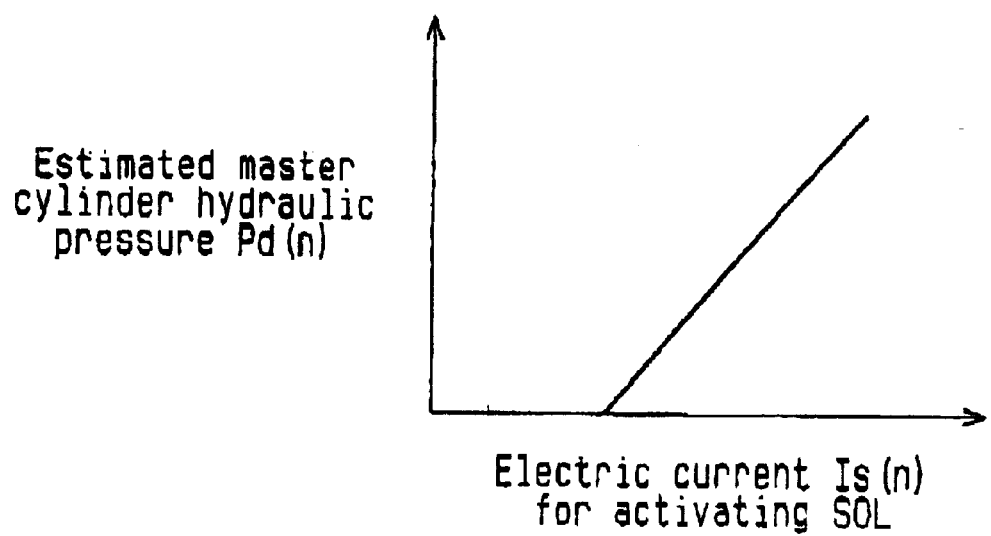
FIG. 8 is a graph illustrating an example of a map for estimating a master cylinder hydraulic pressure Pd(n).

As described above, when the brake pedal BP is operated by the driver during the control while on the down-hill, the target vehicle speed Vc is corrected to become a smaller value than the reference target vehicle speed Va by the brake correcting vehicle speed Vb corresponding to the amount of the braking operation Ba. The electric current Is(n) at the present time is hence determined based upon a difference between the target vehicle speed Vc and the actual vehicle speed Vs. A master cylinder hydraulic pressure Pd(n) is then estimated based upon the electric current Is(n) at the present time following the map illustrated in FIG. 8. The master cylinder hydraulic pressure Pd(n) is referenced at step 105 illustrated in FIG. 3 to calculate the amount of the braking operation Ba(n+1) at the next time.

Figure 9:
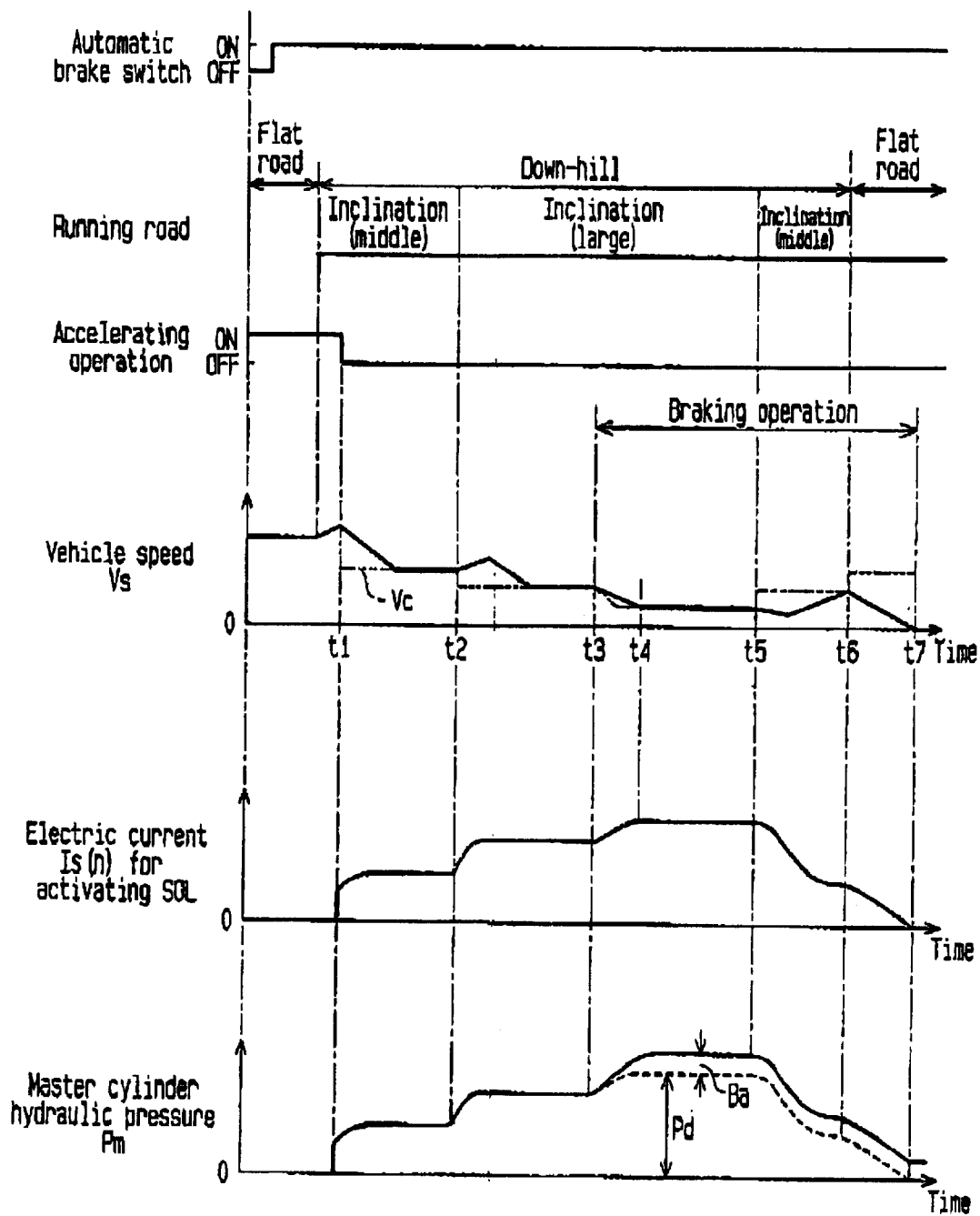
FIG. 9 is a graph illustrating an example of various parameters associated with the auto-braking control.

Referring to FIG. 9, when the accelerating operation is stopped by the driver at t1 for ensuring an engine brake in the state where the vehicle is running from the flat road towards the down-hill while the automatic brake switch AB is turned ON by the driver, the target vehicle speed Vc is adjusted to be decreased (according to steps 206, 207, 208 in FIG. 4). As a result, a difference between the vehicle speed Vs and the target vehicle speed Vc occurs as illustrated by double dashed-lines around the central portion of FIG. 9. The variation of the electric current ΔIs is calculated based upon the map illustrated in FIG. 7 corresponding to the absolute value of the difference |Vs−Vc| so that the electric current Is(n) at the present time is determined (at step 210 in FIG. 4). Therefore, the solenoid valve V1 is electrically operated based upon the electric current Is(n) outputted as illustrated by the second region from the bottom in FIG. 9. The master cylinder hydraulic pressure is outputted as illustrated by the bottom region in FIG. 9 corresponding to the electric current Is(n) supplied to the solenoid valve V1. Therefore, the auto-braking control is commenced to control the vehicle speed Vs to meet the target vehicle speed Vc.

When the slope angle of the down-hill on which the vehicle is running is increased at t2, a difference between the vehicle speed Vs and the target vehicle speed Vc occurs again. Therefore, the electric current Is(n) is controlled to cause the vehicle speed Vs to approach and meet the target vehicle speed Vc in the same manner as described above. Further, the master cylinder hydraulic pressure Pm is controlled in the same manner as described above.

When the brake pedal BP is operated by the driver at t3 in a state where the vehicle speed Vs meets or is equal to the target vehicle speed Vc, the master cylinder hydraulic pressure Pm is outputted as illustrated by the solid line in FIG. 9. The master cylinder hydraulic pressure Pm is a pressure value calculated by adding the master cylinder hydraulic pressure corresponding to the amount of braking operation Ba to the master cylinder hydraulic pressure Pd under the auto-braking control. The master cylinder hydraulic pressure Pd under auto-braking control is illustrated by the broken line in FIG. 9. As described above, the brake hydraulic pressure by operation of the brake pedal BP is only the hydraulic pressure corresponding to the amount of the braking operation Ba illustrated between the broken line and the solid line in FIG. 9 when the brake pedal BP is operated by the driver during the auto-braking control. Therefore, the load generated by the braking operation can be decreased.

When the slope angle of the down-hill is decreased at t5 under the above condition, the target vehicle speed Vc illustrated by the double-dashed line becomes larger than the vehicle speed Vs. In this case, the electric current Is(n) is set to be decreased (at step 212 in FIG. 4). The master cylinder hydraulic pressure Pm is thus decreased as well. Further, when the vehicle is running from the down-hill (middle inclination) towards the flat road at t6, the target vehicle speed Vc becomes larger than the vehicle speed Vs. In this case, the electric current Is(n) is set to be decreased. The master cylinder hydraulic pressure Pm is thus further decreased. When the electric current Is(n) becomes zero at t7, the auto-braking control is terminated (at step 213 in FIG. 4).

Figure 10:
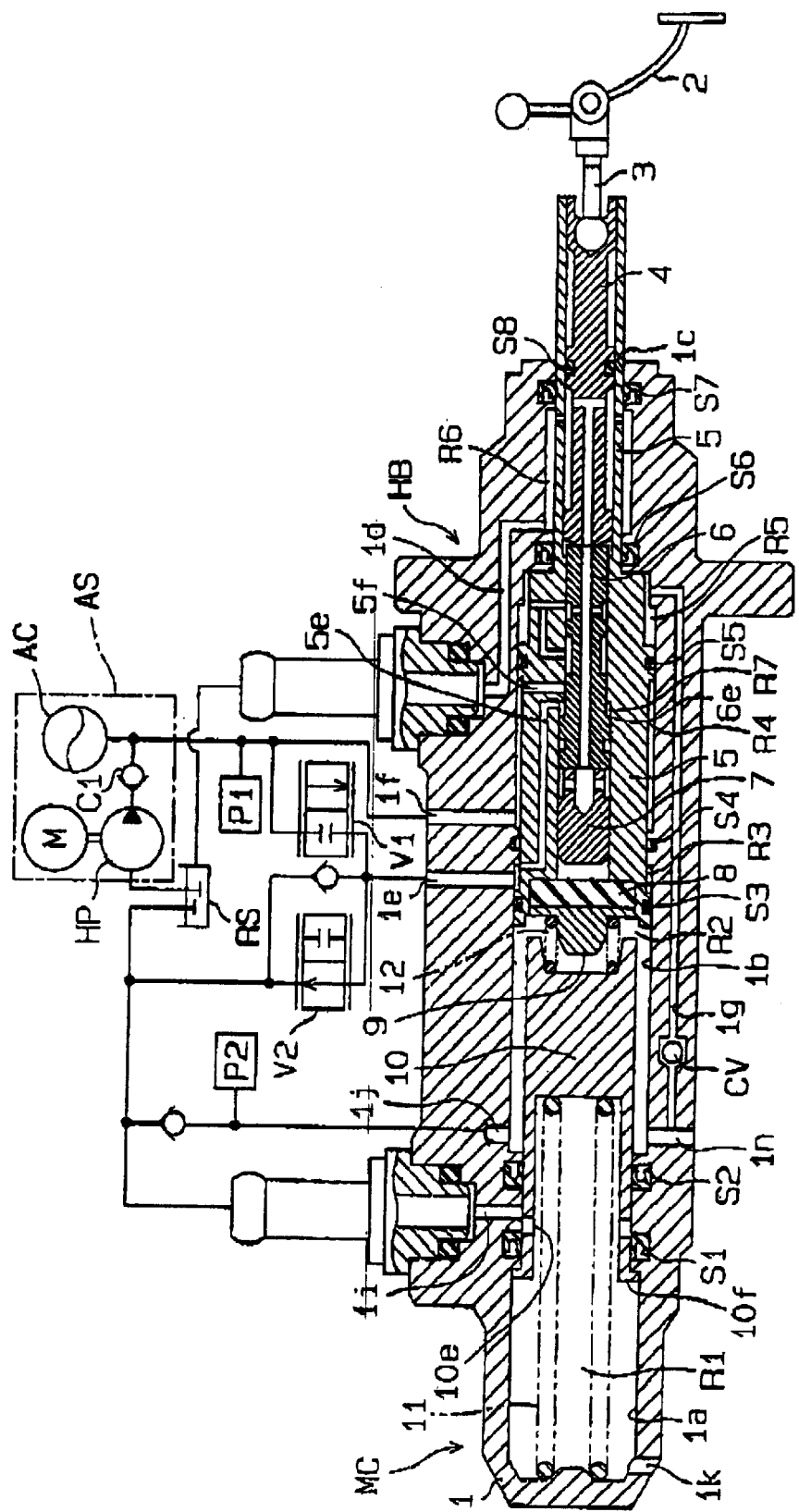
FIG. 10 is a cross-sectional view of the overall structure of the hydraulic brake apparatus.

Next, the overall structure of the hydraulic brake apparatus is described with reference to FIGS. 10 and 11. The overall structure of the hydraulic brake apparatus is depicted in FIG. 10 and the hydraulic pressure booster HB positioned at an initial position is illustrated in a slightly enlarged manner in FIG. 11. A depressing force applied to a brake pedal 2 (corresponding to the brake pedal BP in FIG. 1) is transmitted via an input rod 3 as a brake operating force. A brake hydraulic pressure is boosted by a hydraulic pressure booster HB (corresponding to the regulating means RG in FIG. 1) corresponding to the movement of the input rod 3 and is outputted from a master cylinder MC (corresponding to the master cylinder MC in FIG. 1) to wheel brake cylinders mounted on the respective vehicle wheels. The wheel brake cylinder is not illustrated in FIGS. 10 and 11.

A housing 1 forming the master cylinder MC as shown in FIG. 10 includes a cylinder bore 1a and a cylinder bore 1b. The diameter of the cylinder bore 1b is larger than the diameter of the cylinder bore 1a. A power piston 5 and a master piston 10 in the form of a cylindrical structure with a bottom at one end are accommodated in series in the housing 1. Annular cup like sealing members S1, S2 are disposed at the front side in the housing 1. The master piston 10 is hermetically and slidably supported via the sealing members S1, S2 so that a first pressure chamber R1 is defined in front of the master piston 10. The power piston 5 disposed behind the master piston 10 in the housing 1 is hermetically and slidably supported by an opening portion 1c defined at an end side of the housing 1 so that a second pressure chamber R2 is defined between the master piston 10 and the power piston 5.

Fluid supply ports 1i, 1j and outlet ports 1k, 1n are defined in the housing 1. The outlet port 1k is connected to the first pressure chamber R1 and each wheel brake cylinder mounted at the respective front vehicle wheels. The outlet port 1n is connected to the second pressure chamber R2 and each wheel brake cylinder mounted at the respective rear vehicle wheels.

A return spring 11 is disposed between the front end surface in the housing 1 and a recessed bottom portion of the master piston 10 to bias the master piston 10 in the rearward direction (i.e., to the right in FIG. 10). An engaging portion 10f is formed at the front end of the master piston 10 and is bent outwardly. The engaging portion 10f engages a stepped portion in the housing 1 to limit rearward movement of the master piston 10. When the master piston 10 is not activated and is positioned at its rear end position, the first pressure chamber R1 communicates with the reservoir RS via a communicating hole 10e defined at a skirt portion of the master piston 10 and the fluid supply port 1i.

Figure 11:
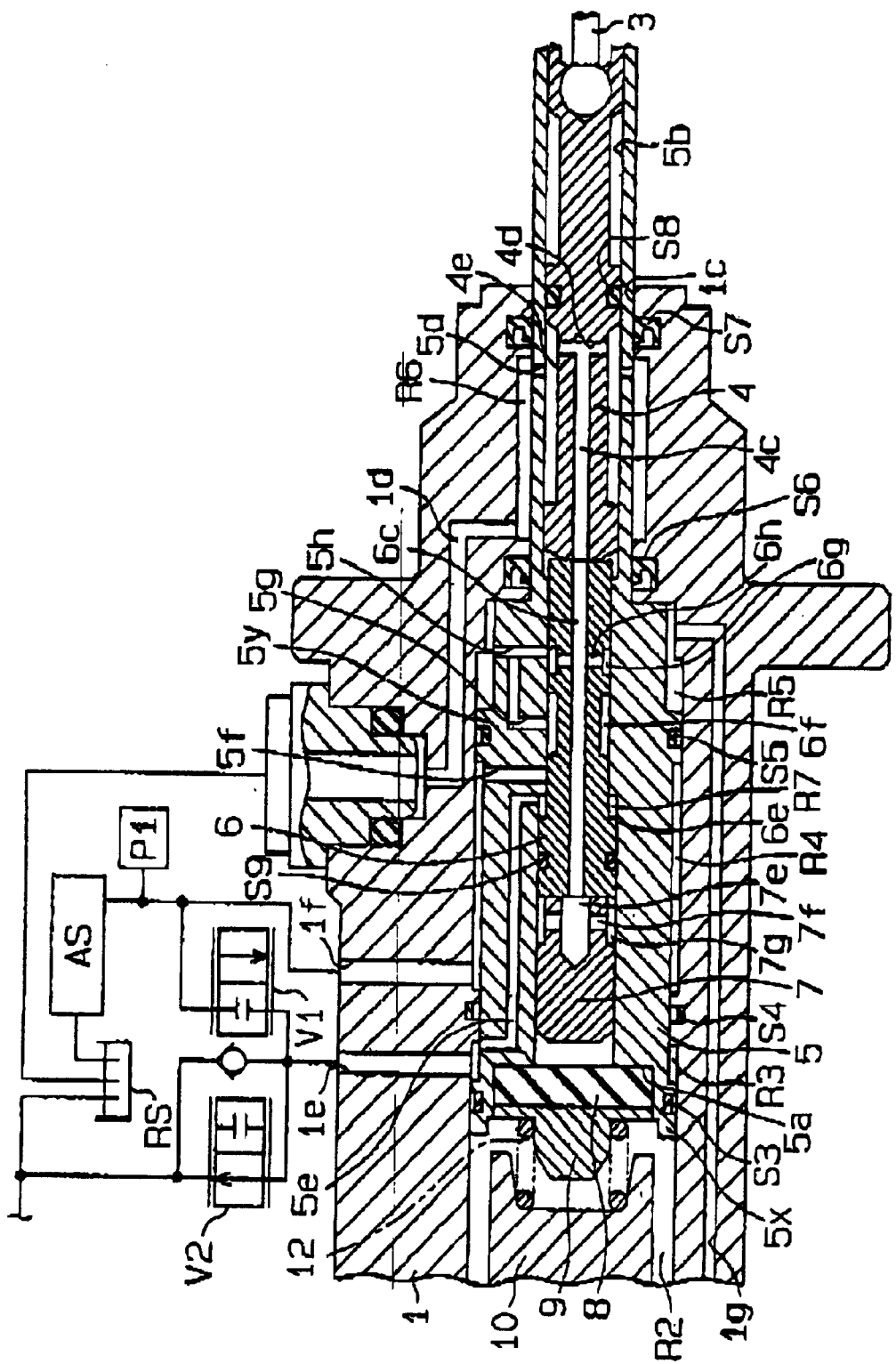
FIG. 11 is an enlarged cross-sectional view of the hydraulic pressure booster portion of the apparatus shown in FIG. 10.

Referring to FIG. 11, a sealing member S3 is disposed in a land portion 5x formed at the front side of the power piston 5 and a sealing member S5 is disposed in a land portion 5y formed at the rear side of the power piston 5. A sealing member S4 is disposed between the sealing members S3, S5 at the inner surface of the housing 1. In addition, spaced apart annular cup-like sealing members S6, S7 are disposed at an end side in the housing 1 with a predetermined distance between the sealing members S6, S7. An annular chamber R6 is defined between the sealing members S6, S7 and between the inner surface of the housing 1 and the outer surface of the power piston 5. It is to be noted that the housing 1 is required to be shaped from a plurality of cylinders and the power piston 5 is required to be shaped from two separated members in order to dispose the sealing members S1–S7 as shown in FIGS. 10 and 11. However, for purposes of simplifying the illustration and description, the housing 1 and the power piston 5 are described and illustrated as being a single unit.

The second pressure chamber R2 is defined between the sealing members S2, S3, an annular chamber R3 is defined between the sealing members S3, S4, an annular chamber R4 is defined between the sealing members S4, S5, and a power chamber R5 is defined between the sealing members S5, S6. A recessed portion 5a is defined at the front side of the power piston 5, and a cylindrical portion 5b with a stepped portion is defined behind the recessed portion 5a in the power piston 5. A communicating hole 5e defined in the power piston 5 connects the cylindrical portion 5b with the annular chamber R3. A communicating hole 5f defined in the power piston 5 communicates with the annular chamber R4. Several communicating holes 5g, 5h defined in the power piston 5 communicate with the power chamber R5. A communicating hole 5d defined in the power piston S communicates with the annular chamber R6.

An input member 4 is hermetically and slidably accommodated via a sealing member S8 at one end side in the cylindrical portion 5b of the power piston 5. The input rod 3 is operatively connected to an end portion of the input member 4. An axially extending communicating hole 4c is defined in the input member 4 and communicates with a drain port 1d via a radially extending communicating hole 4d defined in the input member 4, an annular groove 4e, the communicating hole 5d and the annular chamber R6. A spool 6 is hermetically and slidably supported via a sealing member S9 in front of the input member 4 in the cylindrical portion 5b. Further, a plunger 7 is slidably accommodated in front of the spool 6. A rubber made reaction disc 8 is disposed in the recessed portion 5a and serves as an elastic member for transmitting a reaction force. A pressure receiving member 9 is accommodated in contact with the front surface of the reaction disc 8 and is movable back and forth. A return spring 12 is disposed between the master piston 10 and the pressure receiving member 9 to effect a direct force transmission between the master piston 10 and the pressure receiving member 9. A slight clearance is defined between the reaction disc 8 and the front end surface of the plunger 7 under a non-operative condition as illustrated in FIGS. 10 and 11.

As shown in FIG. 11, an axially extending communicating hole 6c is defined in the spool 6 and a stepped portion 6e is formed at the outer surface of the spool 6. Several annular grooves 6f, 6g are defined at the outer surface of the smaller diameter portion of the spool 6. The communicating hole 6c communicates with the annular groove 6g via a radially extending communicating hole 6h defined in the spool 6. When the hydraulic brake apparatus is not activated as illustrated in FIG. 11, the annular grooves 6f, 6g face the opening portions of the communicating holes 5g, 5h, respectively. The power chamber R5 communicates with the communicating hole 6c via the communicating hole 5h, the annular groove 6g and the communicating hole 6h. When the spool 6 is moved in the forward direction, the communication between the power chamber R5 and the communicating hole 6c is interrupted. Further, the power chamber R5 communicates with an inlet port 1f via the communicating hole 5g, the annular groove 6f, and the communicating hole 5f. A hydraulic pressure introducing chamber R7 is defined behind the stepped portion 6e. When the auto-braking control is performed, hydraulic pressure outputted from the auxiliary hydraulic pressure source AS is supplied to the hydraulic pressure introducing chamber R7 via the communicating hole 5e. Further, a hydraulic pressure chamber is defined between the rear end of the spool 6 and the input member 4. The hydraulic pressure chamber communicates with the reservoir RS, and yet does not communicate with the hydraulic pressure introducing chamber R7.

An annular groove 7g is defined at the outer surface of the plunger 7. An axially extending hole 7e defined in the plunger 7 opens in the rearward direction and faces an opening portion of the communicating hole 6c of the spool 6. The hole 7e communicates with the annular groove 7g via a radially extending communicating hole 7f defined in the plunger 7. Therefore, a space in which is disposed the plunger 7 communicates with the drain port id via the communicating hole 6c, the communicating holes 4c, 4d, the annular groove 4e, the communicating hole 5d, and the annular chamber R6.

An inlet port 1e, the inlet port 1f and the drain port 1d are defined at the rear side of the housing 1. The drain port id communicates with the reservoir RS. The inlet ports 1e, 1f communicate with the auxiliary hydraulic pressure source AS. The inlet port 1e communicates with the annular chamber R3, communicates with the auxiliary hydraulic pressure source AS via the linear solenoid valve V1, and communicates with the reservoir RS via the linear solenoid valve V2. As shown in FIG. 10, the inlet side of the hydraulic pressure pump HP included in the auxiliary hydraulic pressure source AS communicates with the reservoir RS. The outlet side of the hydraulic pressure pump HP communicates with the accumulator AC, via the check valve 01 and then communicates with the inlet port if. As described above, the outlet side of the hydraulic pressure pump HP further communicates with the inlet port 1e via the solenoid valve V1.

A fluid passage 1g is also defined in the housing 1 for connecting the second pressure chamber R2 and the power chamber R5. A normally open-type pressure differential responsive check valve CV (hereinafter referred to as a check valve CV) is disposed in the fluid passage 1g. The check valve CV normally connects the second pressure chamber R2 with the power chamber R5. The check valve CV is operated to be closed in response to a pressure differential between the power chamber R5 and the second pressure chamber R2. When the hydraulic pressure in the power chamber R5 is larger than the hydraulic pressure in the second pressure chamber R2 and when the pressure differential between the two chambers R5, R2 is equal to or greater than a predetermined value, the communication between the power chamber R5 and the second pressure chamber R2 is interrupted by the closed check valve CV. On the other hand, when the hydraulic brake apparatus is not activated, the pressure differential is not generated between the power chamber R5 and the second pressure chamber R2, and the check valve CV is maintained at the open position. Therefore, when the pressure chamber R2 is required to be filled with brake fluid, an evacuation of the air in the second pressure chamber R2 can be performed easily and accurately by bleeding air from the power chamber R5 and by introducing the brake fluid from the reservoir RS via the fluid supply port 1$j$ to the second pressure chamber R2.

The operation of the hydraulic brake apparatus having the structure described above and illustrated in FIGS. 10 and 11 is as follows. When the brake pedal 2 is under the non-operated condition, each component of the hydraulic brake apparatus is located at the initial position shown in FIGS. 10 and 11. In this case, the hydraulic pressure booster HS is under the non-operated condition with the solenoid valve V1 at the closed position and the solenoid valve V2 at the open position. Under the above condition, the annular chamber R4 communicates with the accumulator AC, while communication between the communicating hole 5$f$ and the power chamber R5 is blocked by the spool 6. The power chamber R5 communicates with the reservoir RS via a communicating hole 5$h$, the annular groove 6$g$, the communicating holes 6$h$, 6$c$, the communicating holes 4$c$, 4$d$, the annular groove 4$e$, the communicating hole 5$d$, the annular chamber R6, and the drain port 1$d$. The power chamber R5 further communicates with the second pressure chamber R2 via the fluid passage 1$g$ and the check valve CV. Therefore, even when the auxiliary hydraulic pressure source AS is driven, the power piston 5 is applied only with a rearward pushing force by the hydraulic pressure in the annular chamber R4 so as to be maintained at the initial position shown in FIGS. 10 and 11.

When the brake pedal 2 is operated, the spool 6 is moved in the forward direction corresponding to the forward movement of the input member 4 to interrupt communication between the power chamber R5 and the communicating hole 6$c$ via the communicating hole 5$h$ which is blocked by the spool 6. The annular groove 6$f$ faces the opening portions of the communicating holes 5$f$, 5$g$ and so the power hydraulic pressure is fed into the power chamber R5 via the inlet port 1$f$, the communicating hole 5$f$, the annular groove 6$f$, and the communicating holes 5$g$, 5$h$. The inlet port 1$e$ communicates with the hydraulic pressure introducing chamber R7 via the annular chamber R3 and the communicating hole 5$e$. The solenoid valve V1 is still at the closed position and the solenoid valve V2 is still at the open position. The inlet port 1$e$ communicates with the reservoir RS via the solenoid valve V2. Therefore, the spool 6 is moved forward in response to the forward movement of the input member 4, i.e. in response to the brake pedal operation. When the pressure differential between the power chamber R5 and the second pressure chamber R2 becomes equal to or greater than the predetermined value under the above condition, the check valve CV is operated to be closed. Since the fluid passage 1$g$ is interrupted by the closed check valve CV, the second pressure chamber R2 becomes a hydraulically sealed space filled with the brake fluid.

As described above, when the hydraulic pressure booster HB has been activated after the second pressure chamber R2 becomes the hydraulically sealed space, a pushing pressure applied to the front end surface of the power piston 5 by the second pressure chamber R2 is balanced relative to the brake pedal operating force and a pushing pressure applied to a rear end surface of the poser piston 5. An effective cross-sectional area of the power piston 5 is larger than an effective cross-sectional area of the master piston 10 so that a clearance between the master piston 10 and the poser piston 5 is enlarged or increased by the forward movement of the master piston 10 corresponding to the forward movement of the power piston 5. In this case, the master piston 10 is hydraulically connected to the power piston 5 and is moved integrally with the power piston 5. As described above, when the hydraulic pressure booster HB is activated, the power piston 5 and the master piston 10 are hydraulically integrated via the brake fluid filled in the second pressure chamber R2. The power piston 5 and the master piston 10 are integrally moved forward by the clearance defined between the power piston 5 and the master piston 10. Therefore, the stroke of the brake pedal 2 can be reduced.

When the auto-braking control is performed with the brake pedal 2 (illustrated in FIG. 10) under the non-operated condition, the auxiliary hydraulic pressure source AS is activated with the solenoid valve V1 at the open position and the solenoid valve V2 at the closed position. Each component is still located at the initial position described in FIG. 11 immediately after the auto-braking control is performed. Therefore, communication between the communicating hole 5$f$ and the power chamber R5 is still blocked by the spool 6. The hydraulic pressure outputted form the auxiliary hydraulic pressure source AS is supplied to the hydraulic pressure introducing chamber R7 via the inlet port 1$e$ and the communicating hole 5$e$, wherein the spool 6 is moved in the forward direction.

That is, the power chamber R5 communicates with the auxiliary hydraulic pressure source AS via the communicating hole 5$g$, the annular groove 6$f$, the communicating hole 5$f$ and the inlet port 1$f$. Therefore, the master piston 10 is moved forward corresponding to the forward movement of the power piston 5 so that the brake hydraulic pressure is supplied to each of the wheel brake cylinders mounted on respective vehicle wheels.

Under the above condition, the fluid passage 1$g$ is interrupted by the check valve CV being at the closed position corresponding to the pressure differential between the power chamber R5 and the second pressure chamber R2 so that the second pressure chamber R2 becomes the hydraulically sealed space filled with the brake fluid. Therefore, the master piston 10 is moved forward in response to the pushing force corresponding to the effective area of the power piston 5 by the brake hydraulic pressure introduced into the power chamber R5. Therefore, when the brake pedal 2 is under the non-operative condition, a desired brake hydraulic pressure can be generated by controlling the auxiliary hydraulic pressure source AS and the linear solenoid valves V1, V2 when needed. The brake hydraulic pressure in the second pressure chamber R2 is applied to the pressure receiving member 9 and the reaction disc 8. A forward area of the input member 4 communicates with the reservoir RS via the drain port 1$d$. Therefore, a brake reaction force is not transmitted to the input member 4. The pushing force applied to the pressure receiving member 9 and the reaction disc 8 is opposed by the power hydraulic pressure outputted from the auxiliary hydraulic pressure source AS to the power piston 5. Further, the power hydraulic pressure outputted from the auxiliary hydraulic pressure source AS is fed into the hydraulic pressure introducing chamber R7 defined between the stepped portion 6e and the power piston 5. The hydraulic pressure introducing chamber R7 is structurally separated from the front chamber of the input member 4. Therefore, a reaction force of the power hydraulic pressure fed into the hydraulic pressure introducing chamber R7 from the auxiliary hydraulic pressure source AS is not transmitted to the input member 4.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A hydraulic brake apparatus for a vehicle comprising:

a brake operating member;

a master cylinder including a master piston which is moved in a forward direction in response to a depressing operation of the brake operating member for pressurizing brake fluid in a reservoir and outputting a master cylinder hydraulic pressure to wheel brake cylinders mounted on respective vehicle wheels in response to the movement of the master piston in the forward direction;

an auxiliary hydraulic-pressure source for pressurizing the brake fluid in the reservoir to a first predetermined pressure level and outputting a power hydraulic pressure;

regulating means connected to the auxiliary hydraulic pressure source and the reservoir for regulating the power hydraulic pressure outputted from the auxiliary hydraulic pressure source to a second predetermined pressure level to drive the master piston by the power hydraulic pressure regulated by the regulating means;

valve means for controlling the power hydraulic pressure supplied from the auxiliary hydraulic pressure source to the regulating means;

control means for performing an auto-braking control by controlling operation of the valve means regardless of the depressing operation of the brake operating member to adjust the master cylinder hydraulic pressure supplied to the wheel brake cylinder;

braking operation detecting means for detecting an amount of the depressing operation of the brake operating member;

the control means adjusting the master cylinder hydraulic pressure outputted from the master cylinder by adding the master cylinder hydraulic pressure produced in response to the operation of the brake operating member to a master cylinder hydraulic pressure at the auto-braking control when the brake operating member is operated while the auto-braking control is being performed by the control means.

2. The hydraulic brake apparatus for a vehicle according to claim 1, wherein the control means adjusts the master cylinder hydraulic pressure by controlling operation of the valve means to increase the power hydraulic pressure supplied from the auxiliary hydraulic pressure source to the regulating means corresponding to the amount of operation of the brake operating member detected by the braking operation detecting means.

3. The hydraulic brake apparatus for a vehicle according to claim 2, further comprising:

vehicle speed detecting means for detecting a vehicle speed; and a target vehicle speed determining means for determining a target vehicle speed in response to a vehicle condition;

the control means adjusting the master cylinder hydraulic pressure and performing the auto-braking control by controlling the operation of the valve means so that the vehicle speed detected by the vehicle speed detecting means while the vehicle is running down-hill is equal to the target vehicle speed determined by the target vehicle speed determining means;

the control means including correcting means for correcting the target vehicle speed determined by the target vehicle speed determining means in response to the amount of depressing operation of the brake operating member detected by the braking operation detecting means in a state where the brake operating member is operated during the auto-braking control.

4. The hydraulic brake apparatus for a vehicle according to claim 3, wherein the target vehicle speed determining means determines the target vehicle speed based upon the vehicle speed and either a vehicle acceleration or a vehicle deceleration.

5. The hydraulic brake apparatus for a vehicle according to claim 2, wherein the braking operating detecting means includes a pressure sensor for detecting the master cylinder hydraulic pressure outputted from the master cylinder, with the amount of the depressing operation of the brake operating member being determined based upon a pressure value detected by the pressure sensor.

6. The hydraulic brake apparatus for a vehicle according to claim 2, wherein the braking operation detecting means includes a depressing force sensor which detects a depressing force applied to the brake operating member, with the amount of the depressing operation of the brake operating member being determined based upon a value of the depressing force detected by the depressing force sensor.

7. A hydraulic brake apparatus for a vehicle according to claim 2, wherein the braking operation detecting means includes a stroke sensor which detects a stroke of the brake operating member, with the amount of the depressing operation of the brake operating member being determined based upon a value detected by the stroke sensor.

8. The hydraulic brake apparatus for a vehicle according to claim 2, wherein the valve means includes a linear solenoid valve.

9. The hydraulic brake apparatus for a vehicle according to claim 1, further comprising:

vehicle speed detecting means for detecting a vehicle speed; and a target vehicle speed determining means for determining a target vehicle speed in response to a vehicle condition;

the control means adjusting the master cylinder hydraulic pressure and performing the auto-braking control by controlling the operation of the valve means so that the vehicle speed detected by the vehicle speed detecting means while the vehicle is running down-hill is equal to the target vehicle speed determined by the target vehicle speed determining means;

the control means including correcting means for correcting the target vehicle speed determined by the target vehicle speed determining means in response to the amount of depressing operation of the brake operating member detected by the braking operation detecting means in a state where the brake operating member is operated during the auto-braking control.

10. The hydraulic brake apparatus for a vehicle according to claim 9, wherein the target vehicle speed determining means determines the target vehicle speed based upon the vehicle speed and either a vehicle acceleration or a vehicle deceleration.

11. The hydraulic brake apparatus for a vehicle according to claim 1, wherein the braking operating detecting means includes one of a pressure sensor for detecting the master cylinder hydraulic pressure outputted from the master cylinder, a depressing force sensor which detects a depressing force applied to the brake operating member, and a stroke sensor which detects a stroke of the brake operating member.

12. A hydraulic brake apparatus for a vehicle comprising:

a brake operating member;

a master cylinder including a master piston which is moved forward in response to a depressing operation of the brake operating member to pressurize brake fluid in a reservoir and output a master cylinder hydraulic pressure to a wheel brake cylinder mounted on a vehicle wheel in response to the forward movement of the master piston;

an auxiliary hydraulic pressure source for pressurizing the brake fluid in the reservoir to a first predetermined pressure level and outputting a power hydraulic pressure;

regulating means connected to the auxiliary hydraulic pressure source and the reservoir for regulating the power hydraulic pressure outputted from the auxiliary hydraulic pressure source to a second predetermined pressure level to drive the master piston;

a solenoid valve unit controlling the power hydraulic pressure supplied from the auxiliary hydraulic pressure source to the regulating means;

a sensor which detects an amount of operation of the brake operating member; and control means for performing auto-braking control by controlling operation of the solenoid valve unit independent of operation of the brake operating member to adjust the master cylinder hydraulic pressure supplied to the wheel brake cylinder, the control means adjusting the master cylinder hydraulic pressure outputted from the master cylinder when the brake operating member is operated while the auto-braking control is being performed by the control means by adding the master cylinder hydraulic pressure produced in response to the amount of operation of the brake operating member to the master cylinder hydraulic pressure produced during the auto-braking control.

13. The hydraulic brake apparatus for a vehicle according to claim 12, further comprising:

vehicle speed detecting means for detecting a vehicle speed; and a target vehicle speed determining means for determining a target vehicle speed in response to a vehicle condition;

the control means adjusting the master cylinder hydraulic pressure by controlling the operation of the solenoid valve unit so that the vehicle speed detected by the vehicle speed detecting means while the vehicle is running down-hill is equal to the target vehicle speed determined by the target vehicle speed determining means.

14. The hydraulic brake apparatus for a vehicle according to claim 13, wherein the control means includes correcting means for correcting the target vehicle speed determined by the target vehicle speed determining means in response to the amount of depressing operation of the brake operating member detected by the braking operation detecting means in a state where the brake operating member is operated during the auto-braking control.

15. The hydraulic brake apparatus for a vehicle according to claim 12, wherein the sensor is one of a pressure sensor for detecting the master cylinder hydraulic pressure outputted from the master cylinder, a depressing force sensor which detects a depressing force applied to the brake operating member, and a stroke sensor which detects a stroke of the brake operating member.

16. A method of controlling hydraulic pressure produced by a vehicle hydraulic brake apparatus that comprises a brake operating member, a master cylinder which pressurizes brake fluid in a reservoir through movement of a master piston and outputs a master cylinder hydraulic pressure to a wheel brake cylinder mounted on a vehicle wheel in response to the movement of the master piston, an auxiliary hydraulic pressure source which pressurizes the brake fluid in the reservoir to a predetermined pressure level and outputs a power hydraulic pressure to move the master piston, regulating means connected to the auxiliary hydraulic pressure source and the reservoir for regulating the power hydraulic pressure outputted from the auxiliary hydraulic pressure source to a second predetermined pressure level to drive the master piston, and a solenoid valve unit which controls the power hydraulic pressure supplied from the auxiliary hydraulic pressure source to the regulating means, the method comprising:

detecting an amount of operation of the brake operating member;

performing auto-braking control independent of operation of the brake operating member by controlling operation of the solenoid valve unit to adjust the master cylinder hydraulic pressure supplied to the wheel brake cylinder;

adjusting the master cylinder hydraulic pressure outputted from the master cylinder when the brake operating member is operated during auto-braking control by adding the master cylinder hydraulic pressure produced in response to the detected amount of operation of the brake operating member to the master cylinder hydraulic pressure produced during the auto-braking control.

17. The method according to claim 16, wherein the adjusting of the master cylinder hydraulic pressure is performed by controlling operation of the solenoid valve unit to increase the power hydraulic pressure supplied from the auxiliary hydraulic pressure source to the regulating means based on the detected amount of operation of the brake operating member.

18. The method according to claim 16, further comprising:

detecting a vehicle speed;

determining a target vehicle speed in response to a vehicle condition; and the auto-braking control being performed by controlling operation of the solenoid valve unit so that the detected vehicle speed while the vehicle is running down-hill is equal to the determined target vehicle speed.

19. The method according to claim 18, further comprising:

correcting the determined target vehicle speed in response to the detected amount of depressing operation of the brake operating member when the brake operating member is operated while the auto-braking control is being performed.

20. The method according to claim 16, wherein the amount of depressing operation of the brake operating member is determined by detecting the master cylinder hydraulic pressure outputted from the master cylinder, detecting a depressing force applied to the brake operating member, or detecting a stroke of the brake operating member.

* * * * *